(12) United States Patent
de Lavarene et al.

(10) Patent No.: US 9,268,798 B2
(45) Date of Patent: Feb. 23, 2016

(54) SUPPORT FOR CLOUD-BASED MULTI-TENANT ENVIRONMENTS USING CONNECTION LABELING

(71) Applicant: Oracle International Corporation, Redwood Shores, CA (US)

(72) Inventors: Jean de Lavarene, Menlo Park, CA (US); Tong Zhou, Merrick, NY (US); Douglas Surber, Orinda, CA (US); Stephen Felts, Denville, NJ (US); David Merrill, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 185 days.

(21) Appl. No.: 13/912,098

(22) Filed: Jun. 6, 2013

(65) Prior Publication Data

US 2014/0324911 A1  Oct. 30, 2014

Related U.S. Application Data

(60) Provisional application No. 61/816,610, filed on Apr. 26, 2013, provisional application No. 61/816,623, filed on Apr. 26, 2013.

(51) Int. Cl.
*G06F 17/30* (2006.01)
*G06F 9/50* (2006.01)

(52) U.S. Cl.
CPC ........ *G06F 17/30289* (2013.01); *G06F 9/5011* (2013.01); *G06F 17/30943* (2013.01); *G06F 2209/5011* (2013.01)

(58) Field of Classification Search
CPC ............ G06F 21/6218; G06F 21/6227; G06F 21/6236; G06F 21/6245; G06F 17/30067; G06F 17/30286

USPC ......................................................... 707/781
See application file for complete search history.

(56) References Cited

U.S. PATENT DOCUMENTS

2004/0088413 A1\* 5/2004 Bhogi et al. .................. 709/226
2005/0015411 A1  1/2005 Altman
(Continued)

FOREIGN PATENT DOCUMENTS

WO  2006073865  7/2006
WO  2012037163  3/2012

OTHER PUBLICATIONS

Anonymous, Database Connection Pool Management, Research Disclosure, Dec. 1, 1998, 3 pages, vol. 41, No. 416, Mason Publications, Hampshire, GB.

(Continued)

*Primary Examiner* — Cam-Y Truong
(74) *Attorney, Agent, or Firm* — Tucker Ellis LLP (57) ABSTRACT

A system and method for connection labeling for use with connection pools, including support for cloud-based multi-tenant environments using connection labeling. In accordance with an embodiment, the system comprises a connection pool, including a plurality of connection objects which provide connections that software applications can use to make requests to access the database, wherein each of the connections can be labeled according to the configuration of particular applications; and a connection pool logic that identifies connections labeled as high-cost connections, and controls the creation or repurposing of high-cost connections to serve requests from the multiple tenants or tenant applications.

20 Claims, 8 Drawing Sheets

(56) References Cited

U.S. PATENT DOCUMENTS

| | | |
|---|---|---|
| 2005/0028164 A1 | 2/2005 | Neuwald |
| 2006/0143187 A1 | 6/2006 | Mukkamalla et al. |
| 2006/0146878 A1* | 7/2006 | Srivastava .................. 370/469 |
| 2009/0064199 A1 | 3/2009 | Bidelis et al. |
| 2009/0094589 A1 | 4/2009 | Gupta et al. |
| 2009/0282369 A1 | 11/2009 | Jones |
| 2011/0154329 A1 | 6/2011 | Arcese et al. |
| 2011/0218981 A1* | 9/2011 | Retnakumari et al. ........ 707/705 |
| 2012/0066363 A1* | 3/2012 | Somogyi et al. ............. 709/223 |
| 2012/0136602 A1* | 5/2012 | Hossain et al. ................. 702/85 |
| 2013/0144984 A1 | 6/2013 | Zhao |

OTHER PUBLICATIONS

International Searching Authority at the European Patent Office, International Search Report and Written Opinion for PCT International Patent Application No. PCT/US2014/035187, Aug. 5, 2014, 11 pages.

Das, et al., Oracle Universal Connection Pool for JDBC, Developer's Guide, 11g Release 2 (11.2), Sep. 2009, 74 pages.

* cited by examiner

SUPPORT FOR CLOUD-BASED MULTI-TENANT ENVIRONMENTS USING CONNECTION LABELING

CLAIM OF PRIORITY

This application claims the benefit of priority to U.S. Provisional Patent Application titled "SYSTEM AND METHOD FOR CONNECTION LABELING FOR USE WITH CONNECTION POOLS", Application No. 61/816,610, filed Apr. 26, 2013; and U.S. Provisional Patent Application titled "SUPPORT FOR CLOUD-BASED MULTI-TENANT ENVIRONMENTS USING CONNECTION LABELING", Application No. 61/816,623, filed Apr. 26, 2013; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to connection pools, and are particularly related to a system and method for connection labeling for use with connection pools, including support for cloud-based multi-tenant environments using connection labeling.

INTRODUCTION

Generally described, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connections are found, a new connection can be created and returned to the application. The application uses the connection to access the database to perform work, and then returns the connection to the pool. The connection can then be made available for subsequent connection requests.

Creating connections can be costly both in terms of time and resources. For example, tasks such as network communication, authentication, transaction enlistment, and memory allocation all contribute to the amount of time and resources it takes to create a connection object. Connection pools allow reuse of such connection objects, and reduce the number of times that objects must be created.

One example of a connection pool is Oracle Universal Connection Pool (UCP), which provides a connection pool for caching JDBC connections. Java applications that are database-intensive can use the connection pool to improve performance utilization of system resources. A UCP connection pool can use any JDBC driver to create physical connections that are then maintained by the pool. The connection pool can be configured with properties that are used to optimize pool behavior, based on the performance and availability requirements of an application.

In the context of a multi-tenant environment, such as a cloud environment, or a Fusion Applications multi-tenant environment, connection types may be very complex, due to the need to accommodate multiple tenants, and, e.g., to maintain security between each different tenant's access to the database. These complex connections are considered high-cost connections. Approaches to handling high-cost connections can be useful in improving system performance, and/or the performance of applications operating within a cloud environment.

DETAILED DESCRIPTION

In accordance with an embodiment, described herein is a system which includes a connection pool, wherein the system can identify high-cost connections, and avoid using those high-cost connections to serve requests when the total number of connections is below a particular threshold value. In accordance with an embodiment, the system can be used with, or provide support for a cloud-based or multi-tenant cloud environment that allows access to a database via a connection pool.

In accordance with an embodiment, this allows the connection pool to use new physical connections to serve connection requests from different applications, such as from different tenant applications, without incurring a reinitialization overhead on other connections (e.g., other tenant connections) that may be already pooled.

Connection Labeling

Figure 1:
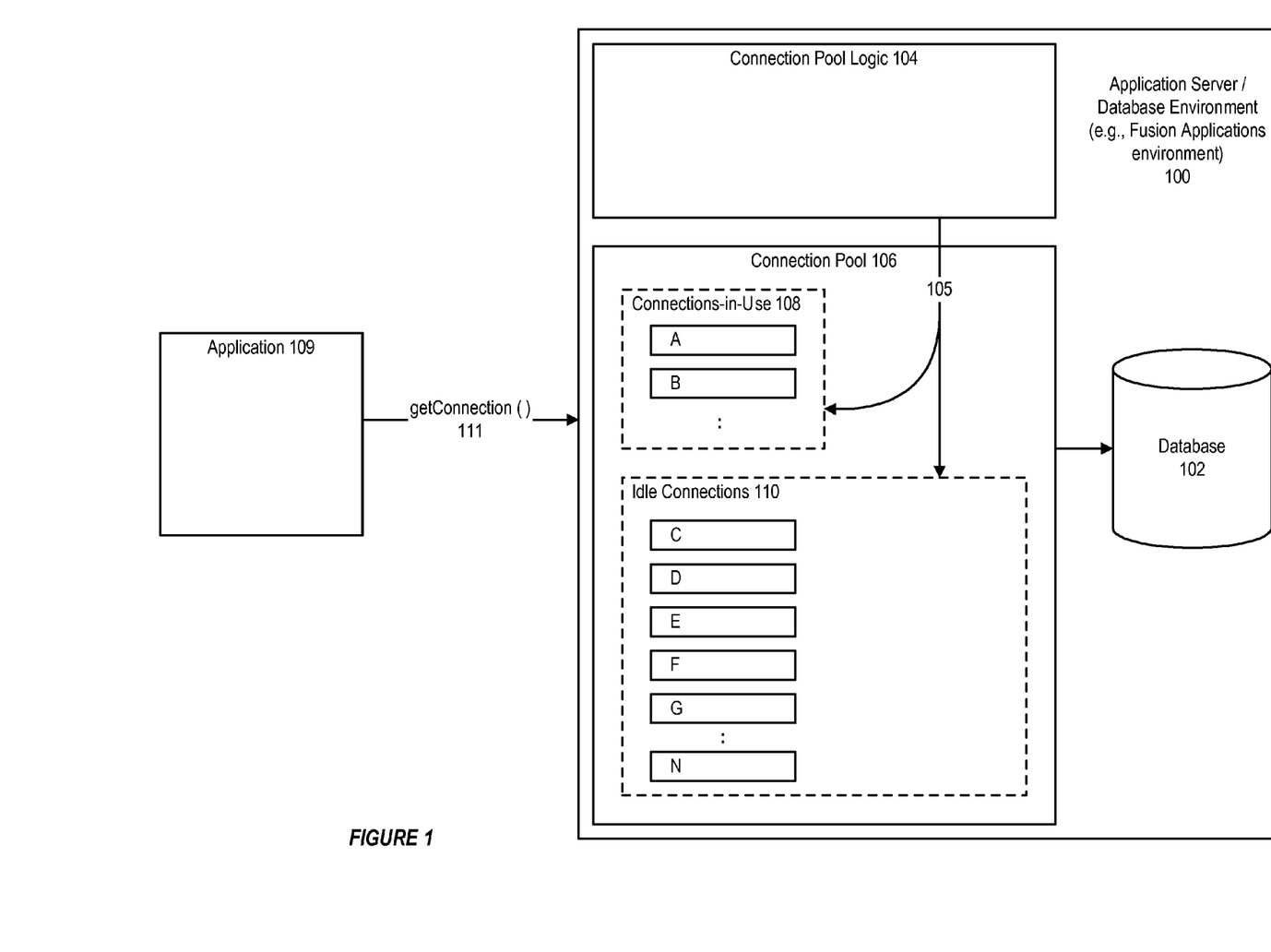
FIG. 1 illustrates a system for connection labeling for use with connection pools, in accordance with an embodiment.

FIG. 1 illustrates a system for connection labeling for use with connection pools, in accordance with an embodiment. As shown in FIG. 1, an application server/database environment 100, such as a Fusion Applications environment, can include or provide access to a database 102. As further shown in FIG. 1, the system also includes a connection pool logic 104, which controls 105 the creation and use of objects in a connection pool 106, including connections that are currently in use 108, and connections that are idle 110.

Software applications 109 may initialize connections 111 retrieved from a connection pool before using the connection. Examples of initialization include simple state re-initializations that require method calls within the application code, or more complex initializations including database operations that require round trips over a network. The cost of these latter types of initialization may be significant.

Some connection pools, such as the Oracle Universal Connection Pool (UCP), allow their connection pools to be configured using connection pool properties. The properties have get and set methods that are available through a pool-enabled data source instance. These methods are a convenient way to programmatically configure a pool. If no pool properties are set, then a connection pool uses default property values.

Figure 2:
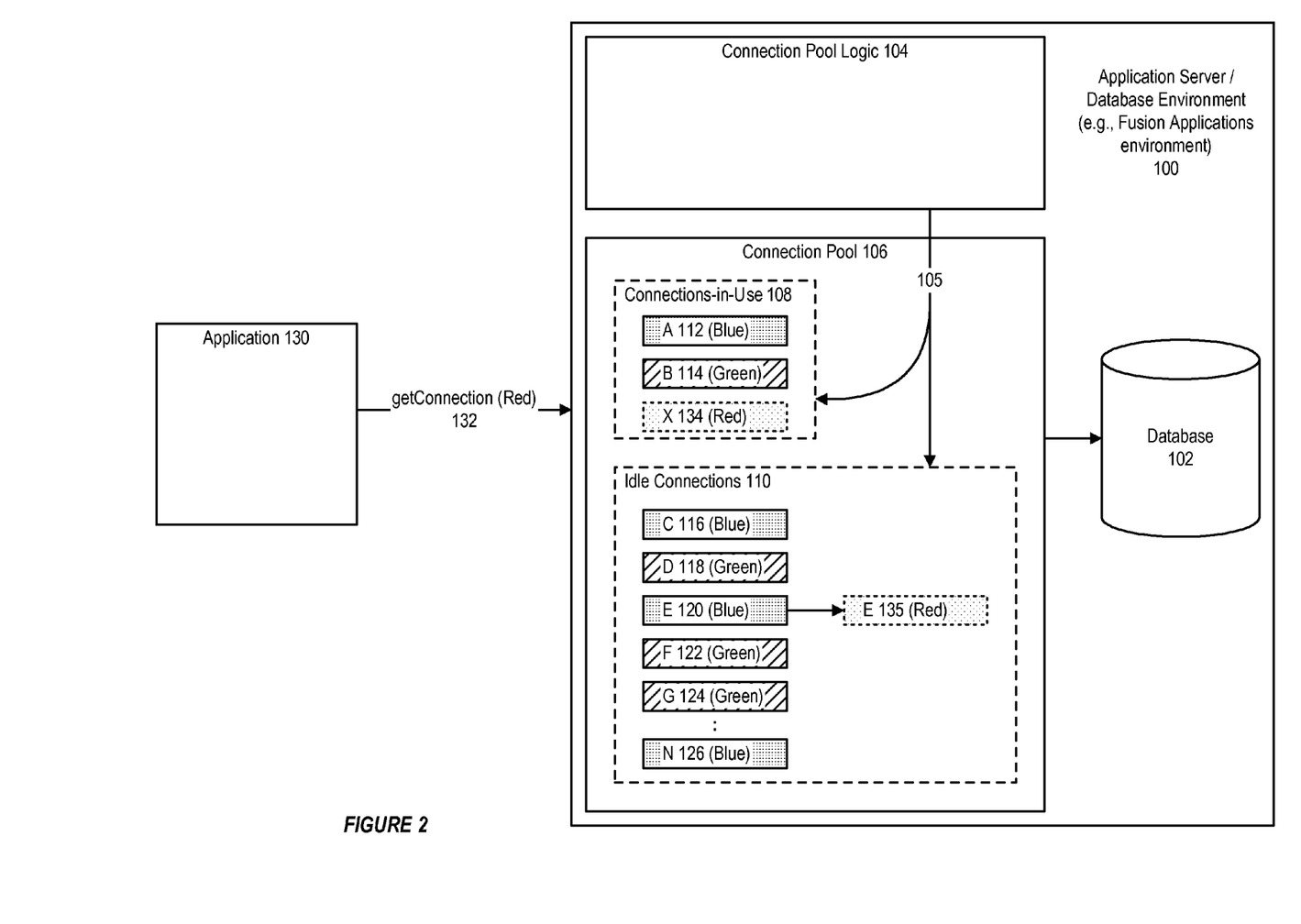
FIG. 2 further illustrates a system for connection labeling for use with connection pools, in accordance with an embodiment.

FIG. 2 further illustrates a system for connection labeling for use with connection pools, in accordance with an embodiment.

In accordance with an embodiment, labeling connections allows an application to attach arbitrary name/value pairs to a connection. The application can then request a connection with a desired label from the connection pool. By associating particular labels with particular connection states, an application can retrieve an already initialized connection from the pool and avoid the time and cost of re-initialization. Connection labeling does not impose any meaning on user-defined keys or values; the meaning of any user-defined keys and values is defined solely by the application.

For example, as shown in FIG. 2, the connection pool can include a plurality of connections that are currently in use, here indicated as connections A 112 and B 114. Each of the connections can be labeled. In the example shown in FIG. 2, connection A 112 is labeled (Blue) and connection B 114 is labeled (Green). These labels/colors are provided for purposes of illustration. In accordance with various embodiments, different types of labels can be used to distinguish between different connection types.

As further shown in FIG. 2, the connection pool can also include a plurality of connections that are idle, here indicated as connections C 116, D 118, E 120, F 122, G 124 and N 126. Each of the idle connections can be similarly labeled, in this illustration as (Blue) or (Green), and again these labels/colors are provided for purposes of illustration.

As further shown in FIG. 2, in accordance with an embodiment, if a software application 130 wishes to make a request on the database, using a particular type of connection, for example a (Red) connection, it can make a getConnection (Red) request 132. In response, the connection pool logic will either create a new (Red) connection, here indicated as X 134 (Red); or repurpose an existing idle connection from (Blue or Green) to (Red), here indicated as E 135 (Red).

Figure 3:
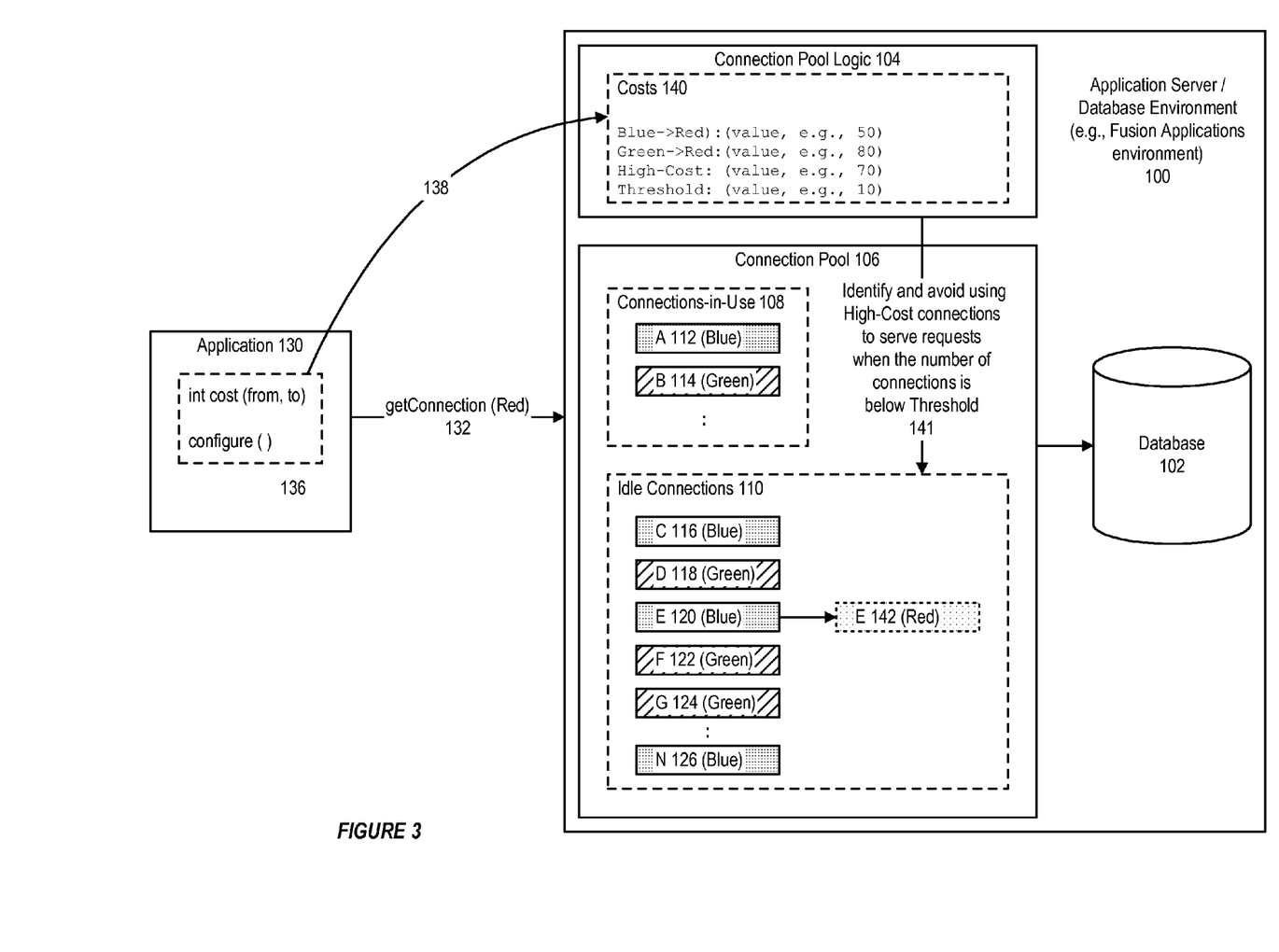
FIG. 3 further illustrates a system for connection labeling for use with connection pools, in accordance with an embodiment.

FIG. 3 further illustrates a system for connection labeling for use with connection pools, in accordance with an embodiment.

In accordance with an embodiment, each software application can utilize a cost function callback to provide configuration information 136 that defines, for that application, costs associated with repurposing connections, and additional configuration information such as high-cost connections and threshold values.

For example, a particular application may consider the cost of repurposing a (Blue) connection to a (Red) connection to have a value of 50; and the cost of repurposing a (Green) connection to a (Red) connection to have a value of 80; that a high-cost connection has a value of 70; and that a reasonable threshold is 10. The meanings of these values are similarly defined by the application, and the above are provided for purposes of illustration. In accordance with various embodiments, different numeric or non-numeric values can be used to distinguish between different connection costs.

In accordance with an embodiment, the connection pool logic iterates over each connection available in the pool. For each connection, it calls a cost method. The result of the cost method is an integer which represents an estimate of the cost required to reconfigure the connection to the required state. The larger the value, the costlier it is to reconfigure the connection.

In accordance with an embodiment, the configuration information 140 provided by the application 138 can be used by the connection pool logic in determining 141 whether to create or repurpose connections, particularly high-cost connections. For example, in accordance with an embodiment, the system can perform a process similar to that illustrated by the pseudocode below.

```
High-Cost: 70
Threshold: 10
getConnection(Red)
IF perfect match (Red)
    THEN return it
    ELSE find cheapest connection
IF cheapest connection's cost < High-Cost
    THEN repurpose this connection
    ELSE IF sum connections < Threshold
        THEN create new connection and apply label
        ELSE sum conn ≥ Threshold THEN repurpose
        cheapest connection
```

Using the above illustration, in accordance with an embodiment, a particular application may define High-Cost to be 70, and Threshold to be 10.

When the system receives a request for a particular connection type (e.g., Red), the connection pool logic first determines if there is a perfect/existing match (i.e., an idle Red connection), and if so returns that connection for use by the application. Else, the connection pool logic finds the cheapest connection that can be repurposed (to be a Red connection). If the cost of the cheapest connection is less than High-Cost (70), then that connection is repurposed. Else, if the total number of connections is less than Threshold (10), then a new (Red) connection is created, labeled accordingly, and provided to the application. Else, if the total number of connections is greater than or equal to Threshold, then the cheapest connection is repurposed as a (Red) connection 142.

Figure 4:
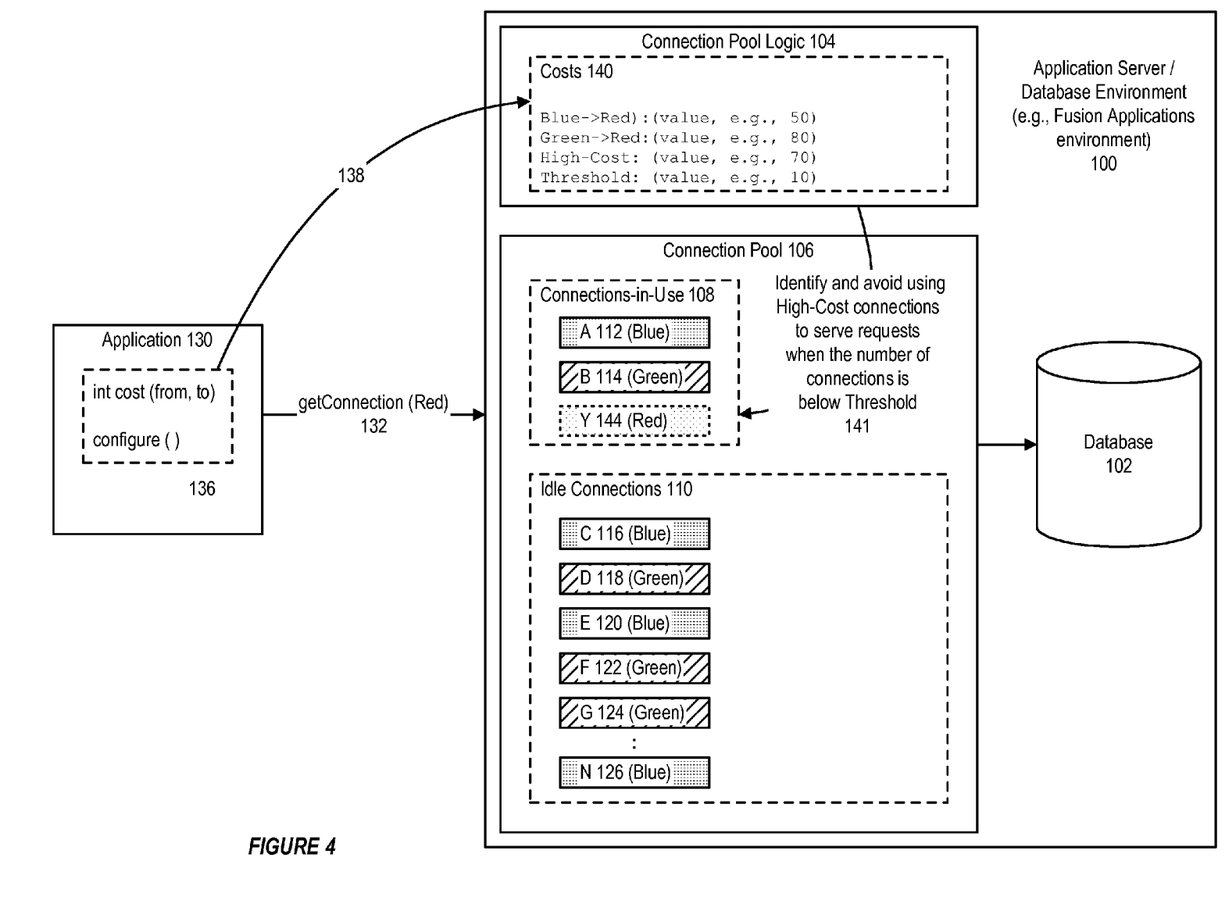
FIG. 4 further illustrates a system for connection labeling for use with connection pools, in accordance with an embodiment.

FIG. 4 further illustrates a system for connection labeling for use with connection pools, in accordance with an embodiment.

In accordance with an embodiment, when the total number of active and idle connections is low, a request to use a high-cost connection of a particular type may result in a new high-cost connection Y 144 (Red) being created, rather than an existing (potentially also high-cost) connection begin repurposed. The new type connection can then be used for subsequent requests of that type. Although the proposed approach may result in a high-cost connection being created, rather than an existing (potentially also high-cost) connection being repurposed, the approach can provide considerable performance improvements, particularly in complex, e.g., multi-tenant cloud environments, which generally utilize high-cost connections.

Figure 5:
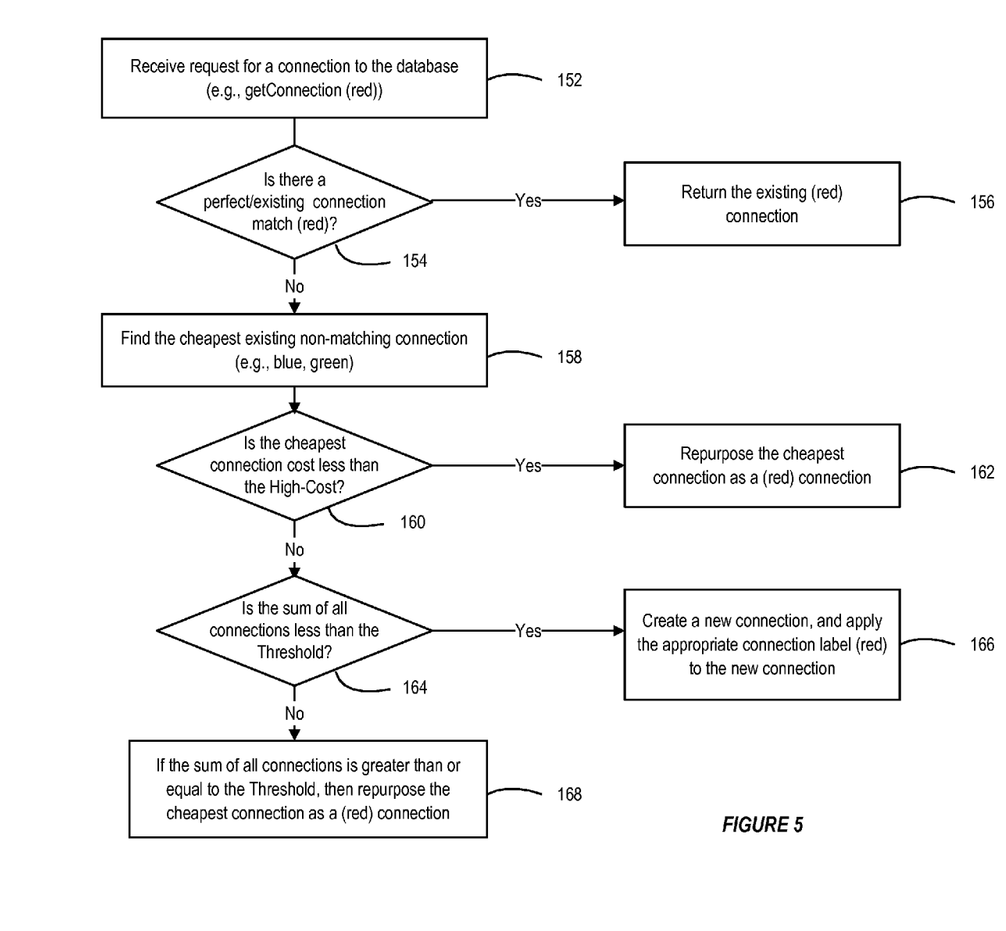
FIG. 5 is a flowchart that illustrates a process of connection labeling for use with connection pools, in accordance with an embodiment.

FIG. 5 is a flowchart that illustrates a process of connection labeling for use with connection pools, in accordance with an embodiment. As shown in FIG. 5, in accordance with an embodiment, at step 152, the system receives a request for a connection to the database (e.g., getConnection (red)).

At step 154, the system determines whether there a perfect/existing connection match (red). If there is an existing matching connection, then at step 156, the existing (red) connection is returned. Otherwise, at step 158, the cheapest existing non-matching connection (e.g., blue, green) is found.

At step 160, the system determines whether the cheapest non-matching connection cost is less than a high-cost. If it is, then at step 162, the cheapest non-matching connection is repurposed as a (red) connection.

At step 164, the system determines whether the sum of all connections is less than a threshold. If it is, then at step 166, a new connection is created, and the appropriate connection label (red) applied to the new connection. Otherwise, at step 168, if the sum of all connections is greater than or equal to the threshold, then the cheapest connection is repurposed as a (red) connection.

The above describes one approach to determining whether to create or repurpose connections, particularly high-cost connections. In accordance with other embodiments and implementations, other approaches can be used. Also, as described above, the labels/colors are provided for purposes of illustration; in accordance with other embodiments different types of labels can be used to distinguish between different connection types.

Connection Labeling with Multi-Tenant Environments

In accordance with an embodiment, a system and method for connection labeling for use with connection pools, can include support for cloud-based multi-tenant environments using connection labeling. In accordance with an embodiment, this type of environment can be considered an "Application as a Service" (AaaS) environment.

Figure 6:
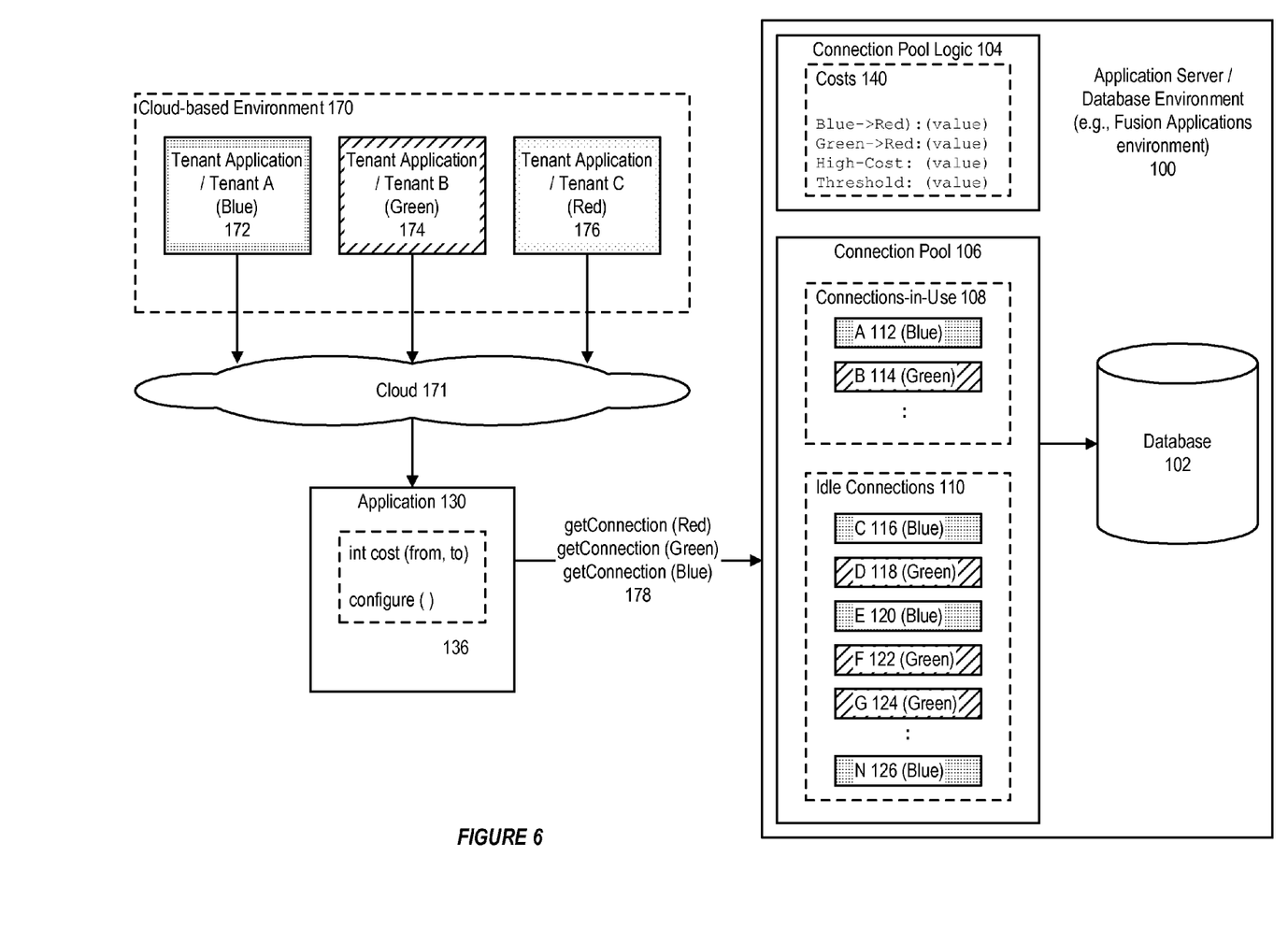
FIG. 6 illustrates a system for connection labeling for use with connection pools, including support for cloud-based multi-tenant environments using connection labeling, in accordance with an embodiment.

FIG. 6 illustrates a system for connection labeling for use with connection pools, including support for cloud-based multi-tenant environments using connection labeling, in accordance with an embodiment. As shown in FIG. 6, a multi-tenant cloud environment can include an application server/database environment 100, such as a Fusion Applications environment, that includes or provides access to a database 102, for use by multiple tenants or tenant applications 172, 174, 176, in a cloud-based environment 170. As further shown in FIG. 6, the system also includes a connection pool logic 104, which controls the creation of objects in a connection pool 106.

Software applications, which are accessed by tenants via the cloud 171, may initialize connections 178 retrieved from a connection pool before using the connection. As described above, examples of initialization include simple state re-initializations that require method calls within the application code, or more complex initializations including database operations that require round trips over a network, and the cost of these latter types of initialization may be significant. As also described above, labeling connections allows an application to attach arbitrary name/value pairs to a connection, and the application can then request a connection with a desired label from the connection pool. By associating particular labels with particular connection states, an application can retrieve an already initialized connection from the pool and avoid the time and cost of re-initialization. Again, connection labeling does not impose any meaning on user-defined keys or values; the meaning of any user-defined keys and values is defined solely by the application.

For example, as shown in FIG. 6, the connection pool can include a plurality of connections that are currently in use 108, here indicated as connections A 112 and B 114; and can also include a plurality of connections that are idle 110, here indicated as connections C 116, D 118, E 120, F 122, G 124 and N 126. Each of the connections can be similarly labeled, in this illustration as (Blue) or (Green), and again these labels/colors are provided for purposes of illustration; in accordance with various embodiments different types of labels can be used to distinguish between different connection types.

Figure 7:
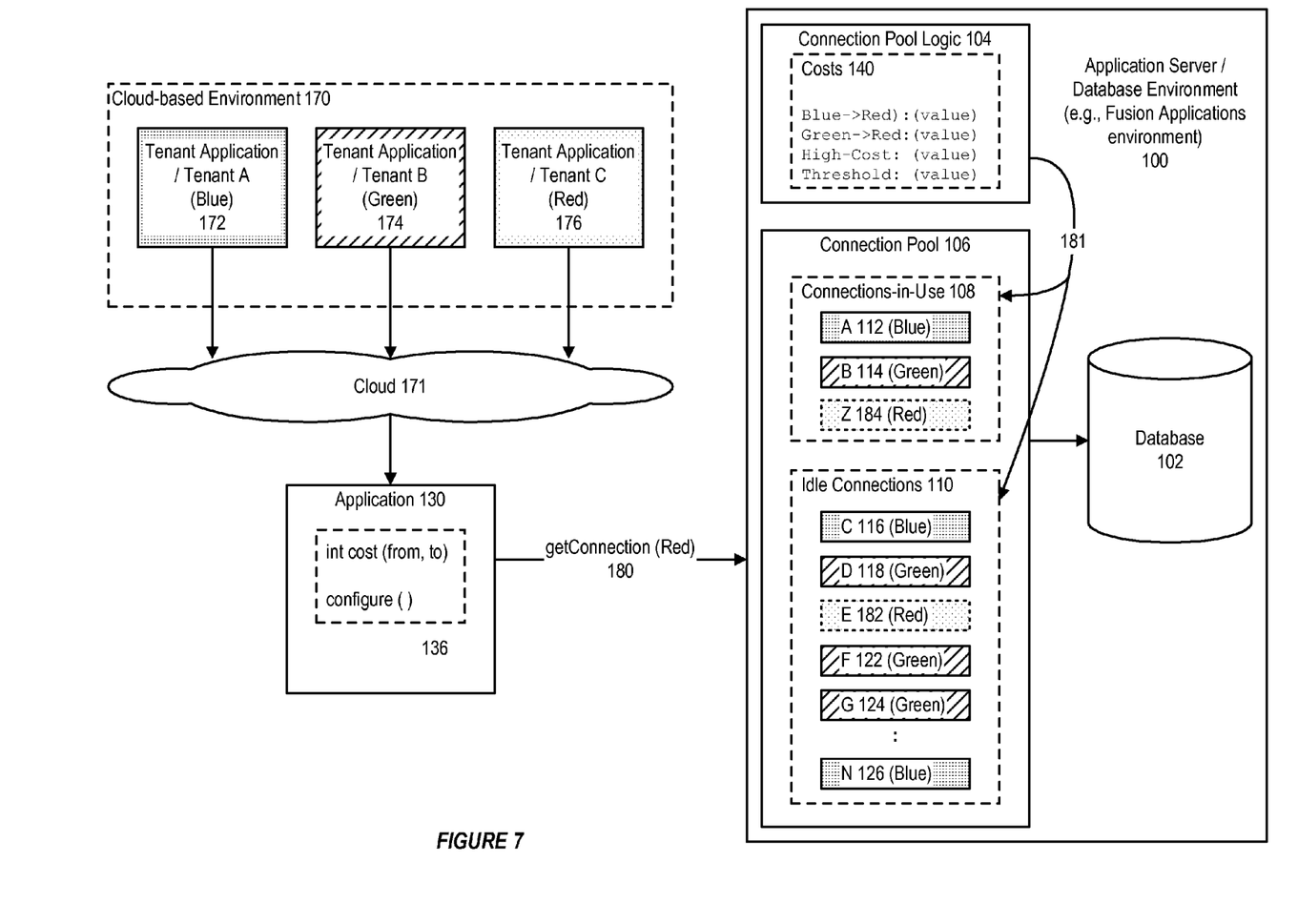
FIG. 7 further illustrates a system for connection labeling for use with connection pools, including support for cloud-based multi-tenant environments using connection labeling, in accordance with an embodiment.

FIG. 7 further illustrates a system for connection labeling for use with connection pools, including support for cloud-based multi-tenant environments using connection labeling, in accordance with an embodiment.

In accordance with an embodiment, if a software application 130 wishes to make a request on the database, using a particular type of connection, for example a (Red) connection, it can make a getConnection(Red) request 180. In response, the connection pool logic will either create a new (Red) connection, or repurpose an existing idle connection from (Blue or Green) to (Red).

In accordance with an embodiment, the connection pool includes support for the application to use a configure ( ) callback to specify a "SET CONTAINER" or to set a container, to repurpose a particular connection from one tenant to another, which has the effect of switching the tenant on a particular database connection.

In accordance with an embodiment, each software application can utilize a cost function callback to provide configuration information 136 that defines, for that application, costs associated with repurposing connections, and additional configuration information such as high-cost connections and threshold values.

For example, a particular application may consider the cost of repurposing a (Blue) connection to a (Red) connection to have a value of 50; and the cost of repurposing a (Green) connection to a (Red) connection to have a value of 80; that a high-cost connection has a value of 70; and that a reasonable threshold is 10. The meanings of these values are similarly defined by the application, and the above are provided for purposes of illustration. In accordance with various embodiments different numeric or non-numeric values can be used to distinguish between different connection costs.

In accordance with an embodiment, the connection pool logic iterates over each connection available in the pool. For each connection, it calls a cost method. The result of the cost method is an integer which represents an estimate of the cost required to reconfigure the connection to the required state. The larger the value, the costlier it is to reconfigure the connection.

In accordance with an embodiment, the configuration information provided by the application can be used by the connection pool logic in determining whether to create or repurpose connections, particularly high-cost connections. For example, in accordance with an embodiment, the system can perform a process similar to that illustrated above.

Using the above illustration, in accordance with an embodiment, a particular application may define High-Cost to be 70, and Threshold to be 10. When the system receives a request for a particular connection type (e.g., Red), the connection pool logic first determines if there is a perfect/existing match (i.e., an idle Red connection), and if so returns that connection for use by the application. Else, the connection pool logic finds the cheapest connection that can be repurposed (to be a Red connection). If the cost of the cheapest connection is less than High-Cost (70), then that connection is repurposed. Else, if the total number of connections is less than Threshold (10), then a new (Red) connection is created, here indicated as Z 184 (Red), labeled accordingly, and provided to the application. Else, if the total number of connections is greater than or equal to Threshold, then the cheapest connection is repurposed as a (Red) connection, here indicated as E 182 (Red).

In accordance with an embodiment, when the total number of active and idle connections is low, a request to use a high-cost connection of a particular type may result in a new high-cost connection being created, rather than an existing (potentially also high-cost) connection begin repurposed. The new type connection can then be used for subsequent requests of that type.

Although the proposed approach may result in a high-cost connection being created, rather than an existing (potentially also high-cost) connection being repurposed, the approach can provide considerable performance improvements, particularly in complex, e.g., multi-tenant cloud environments, which generally utilize high-cost connections.

For example, as shown in FIG. 7, the system can be used by multiple tenants or tenant applications in a cloud-based environment. In such a multi-tenant environment, connection types may be very complex, due to the need to accommodate multiple tenants, and, e.g., to maintain security between each different tenant's access to the database. Using the approach described herein, the performance of applications operating within a cloud environment can be improved.

Figure 8:
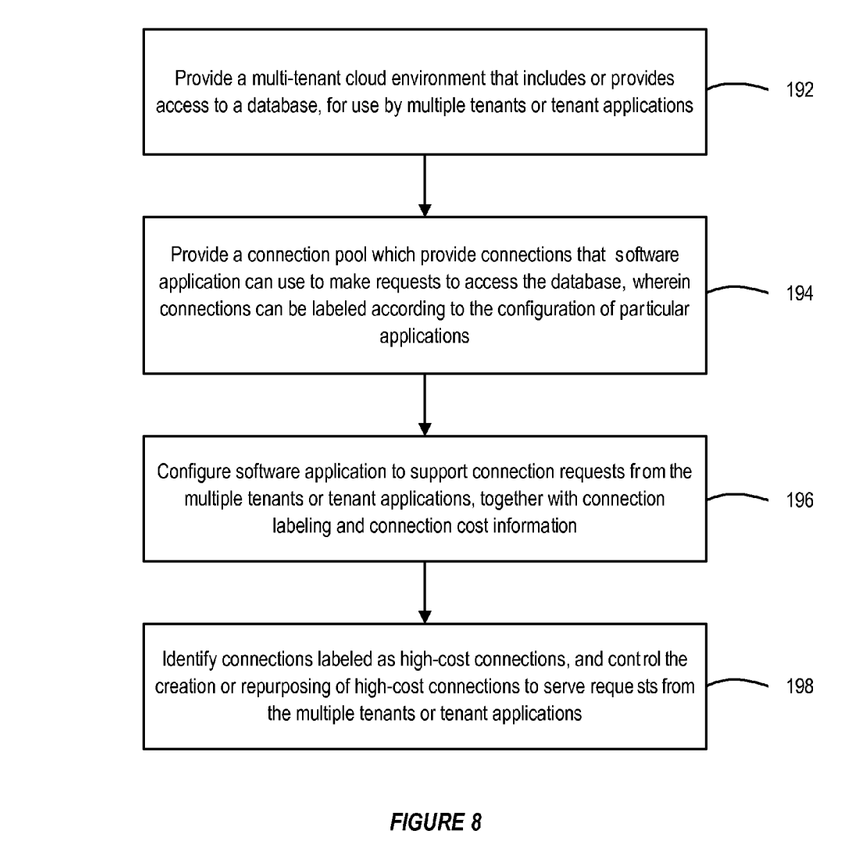
FIG. 8 is a flowchart that illustrates a process of connection labeling for use with connection pools, including support for cloud-based multi-tenant environments using connection labeling, in accordance with an embodiment.

FIG. 8 is a flowchart that illustrates a process of connection labeling for use with connection pools, including support for cloud-based multi-tenant environments using connection labeling, in accordance with an embodiment. As shown in FIG. 8, in accordance with an embodiment, at step 192, a multi-tenant cloud environment is provided, that includes or provides access to a database, for use by multiple tenants or tenant applications.

At step 194, a connection pool is provided, which provides connections that software application can use to make requests to access the database, wherein connections can be labeled according to the configuration of particular applications.

At step 196, a software application is configured to support connection requests from the multiple tenants or tenant applications, together with connection labeling and connection cost information.

At step 198, connections labeled as high-cost connections are identified, and the system thereafter controls the creation or repurposing of high-cost connections to serve requests from the multiple tenants or tenant.

Example Implementations

Provided below are illustrative examples of how connection labeling can be used with connection pools in an Oracle UCP environment, in accordance with various embodiments. In accordance with other embodiments, functionality can be provided, e.g., for use with WebLogic server connection pools, or other types of connection pools.

In Oracle UCP, Connection Labeling (CL) provides a mechanism to identify High-Cost Connections. In accordance with an embodiment, CL must support at least a discrete value; and may support a range of values. CL can provide a Reuse High-Cost Connection Threshold configuration parameter (similar to minpoolsize, maxpoolsize). When the lowest-cost available connection is a High-Cost Connection, the system can test the current pool size against Reuse High-Cost Connection Threshold, and against minimum pool size. If current<minimum or current<threshold, the system returns a new connection. Else if (current>=threshold), the system returns the lowest-cost High-Cost Connection. When there are no available connections, the current behavior holds (i.e., return a new connection, subject to maximum pool size, and if >=maximum pool size, wait for a connection to be available, subject to the timeout, etc.).

In accordance with an embodiment, the UCP Connection Labeling behavior UCP's Connection Labeling feature supports the cost( )method in a Connection Labeling callback implementation, for any application to determine the cost of initializing and reinitializing a connection in the pool. The pool supports flexible cost value range that can be fully customized to application requirements. The pool uses the cost( ) value returned from the callback to determine the best candidate connection to serve each connection request. It always picks the connection with the lowest cost value. The lowest cost value being 0 indicates no reinitialization, while Integer.MAX_VALUE forces the pool to use a brand new physical connection to serve the request. The pool distinguishes between connections with applied labels and without labels. When Connection Labeling is activated, the pool always checks connections in the pool with applied labels first, and only when it cannot find any available labeled connection to serve the request, it attempts to find an available one from the connections without labels. When this fails, it attempts to create a new physical connection if the pool still has room to grow.

In accordance with various embodiments, variations on the above can include:

Add a new UCP pool property ConnectionLabelingHighCost (also available on UCP data sources PoolxxxDataSource). When the set value is greater than 0, connections with a cost value equal to or greater than the property value are considered "high-cost" connections. The default value is Integer.MAX_VALUE. For example, if the property value is set to 5, any connection whose calculated cost value from the labeling callback is equal to or greater than 5 is considered a High-Cost connection.

Add a new UCP pool property HighCostConnectionReuseThreshold (also available on UCP data sources PoolxxxDataSource). When the set value is greater than 0, this specifies a threshold of the number of total connections in the pool beyond which Connection Labeling is allowed to reuse High-Cost connections in the pool to serve a request. Below this threshold, Connection Labeling either uses an available low-cost connection, or creates a brand-new physical connection to serve a request. For example, if the property value is set to 20, Connection Labeling reuses High-Cost connections when there are no low-cost connections available and the total connections reach 20. The default value for HighCostConnectionReuseThreshold is 0. A Connection Labeling callback must be registered at the same time for this property to take effect. Valid Connection Labeling callback registration continues to activate Connection Labeling. The pooling logic checks for the new threshold after the cost-selection iteration, when the lowest cost result is equal to or greater than ConnectionLabelingHighCost. The number of total connections at the moment when this new threshold is checked should account for the number of active connection creation requests (the pool already has code to extract this information). The checking must account for both MinPoolSize and MaxPoolSize. Note that any labeled connection with cost value Integer.MAX_VALUE will not be reused, even after the new threshold is reached. This is consistent with existing connection labeling behavior when the new threshold and ConnectionLabelingHighCost are not set.

In accordance with an embodiment, there is no requirement not to reuse connections without labels (stateless) in the pool to serve connection requests with labels (i.e., labeled requests). Once the HighCostConnectionReuseThreshold is reached and Connection Labeling is activated, the pool still favors connections without labels (stateless) over creating new physical connections.

In accordance with an embodiment, to support a special Connection Labeling callback implementation, for any connection the application considers High-Cost, the cost( ) method in such callback (1) simply returns Integer.MAX_VALUE for such connection, before the pool size reaches the HighCostConnectionReuseThreshold, and (2) switches to return an actual High-Cost value after the threshold is reached. This effectively prohibits existing UCP code from reusing a High-Cost connection to serve a request, below the threshold. The callback implementation can dynamically check the pool size against the threshold.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for connection labeling for use with connection pools, comprising:
a computer including a processor and a database, and providing a multi-tenant cloud environment that includes or provides access to the database, for use by a plurality of tenant applications in a cloud-based environment;
a connection pool, including a plurality of connection objects which provide connections that the plurality of tenant applications use to make requests to access the database, wherein each connection of the connections is labeled according to configuration information of one or more of the plurality of tenant applications; and a connection pool logic that operates to
receive a request, from a tenant application, for a connection with a particular label,
invoke a cost callback method to calculate, for each idle connection in the connection pool, a cost for reconfiguring that idle connection to a state associated with the particular label,
identify one or more of the idle connections as high-cost connections by comparing the calculated cost associated with each idle connection, with a high-cost value, wherein each identified high-cost connection is associated with a calculated cost larger than the high-cost value,
determine whether a total number of active and idle connections in the connection pool is less than a threshold value defined by the tenant application, and
based on a result of the determining, create a new connection, or repurpose one identified high-cost connection of the identified high-cost connections to serve the request from the tenant application.

2. The system of claim 1, wherein each particular one of the plurality of tenant applications is associated with a labeled connection type that the tenant application uses to connect to the database.

3. The system of claim 1, wherein the connection pool includes support for the tenant application to use a configure callback to repurpose a particular connection from the tenant application to another of the plurality of tenant applications, which has the effect of switching the tenant application on the particular connection.

4. The system of claim 1, wherein the connection pool logic further performs the steps comprising
determining, for the received request, if there is an existing matching connection; and
if there is an existing matching connection, returning the existing matching connection.

5. The system of claim 1, wherein the cost for configuring each idle connection to the state associated with the particular label is an estimated value.

6. The system of claim 1, wherein the repurposed connection is the cheapest identified high-cost connection in the connection pool.

7. The system of claim 1, wherein the state is defined by the particular label.

8. A method for connection labeling for use with connection pools, comprising:
providing, at a computer including a processor and a database, a multi-tenant cloud environment that includes or provides access to the database, for use by a plurality of tenant applications in a cloud-based environment;
providing a connection pool, including a plurality of connection objects which provide connections that the plurality of tenant applications use to make requests to access the database, wherein each connection of the connections is labeled according to configuration information of one or more of the plurality of tenant applications;
receiving a request, from a tenant application, for a connection with a particular label;
invoking a cost callback method to calculate, for each idle connection in the connection pool, a cost for reconfiguring that idle connection to a state associated with the particular label;
identifying, using a connection pool logic, one or more of the idle connections as high-cost connections by comparing the calculated cost associated with each idle connection, with a high-cost value;
determining whether a total number of active and idle connections in the connection pool is less than a threshold value; and
based on a result of the determining, creating a new connection, or repurposing one identified high-cost connection of the identified high-cost connections to serve the request from the tenant application.

9. The method of claim 8, wherein each particular one of the plurality of tenant applications is associated with a labeled connection type that the tenant application uses to connect to the database.

10. The method of claim 8, wherein the connection pool includes support for the tenant application to use a configure callback to repurpose a particular connection from the tenant application to another of the plurality of tenant applications, which has the effect of switching the tenant application on the particular connection.

11. The method of claim 8, wherein the connection pool logic further performs the steps comprising
   - determining, for the received request, if there is an existing matching connection; and
   - if there is an existing matching connection, returning the existing matching connection.

12. The method of claim 8, wherein the cost for configuring each idle connection to the state associated with the particular label is an estimated value.

13. The method of claim 8, wherein the repurposed connection is the cheapest identified high-cost connection in the connection pool.

14. The method of claim 8, wherein the state is defined by the particular label.

15. A non-transitory computer readable storage medium, including instructions stored thereon which when read and executed by one or more computers cause the one or more computers to perform the steps comprising:
   - configuring, at a computer including a processor and a database, a multi-tenant cloud environment that includes or provides access to the database, for use by a plurality of tenant applications in a cloud-based environment;
   - configuring a connection pool, including a plurality of connection objects which provide connections that the plurality of tenant applications use to make requests to access the database, wherein each connection of the connections is labeled according to configuration information of one or more of the plurality of tenant applications;
   - receiving a request, from a tenant application, for a connection with a particular label;
   - invoking a cost callback method to calculate, for each idle connection in the connection pool, a cost for reconfiguring that idle connection to a state associated with the particular label;
   - identifying, using a connection pool logic, one or more of the idle connections as high-cost connections by comparing the calculated cost associated with each idle connection, with a high-cost value;
   - determining whether a total number of active and idle connections in the connection pool is less than a threshold value; and
   - based on a result of the determining, creating a new connection, or repurposing one identified high-cost connection of the identified high-cost connections to serve the request from the tenant application.

16. The non-transitory computer readable storage medium of claim 15, wherein each particular one of the plurality of tenant applications is associated with a labeled connection type that the tenant application uses to connect to the database.

17. The non-transitory computer readable storage medium of claim 15, wherein the connection pool includes support for the tenant application to use a configure callback to repurpose a particular connection from the tenant application to another of the plurality of tenant applications, which has the effect of switching the tenant application on the particular connection.

18. The non-transitory computer readable storage medium of claim 15, wherein the connection pool logic further performs the steps comprising
   - determining, for the received request, if there is an existing matching connection; and
   - if there is an existing matching connection, returning the existing matching connection.

19. The non-transitory computer readable storage medium of claim 15, wherein the cost for configuring each idle connection to the state associated with the particular label is an estimated value.

20. The non-transitory computer readable storage medium of claim 15, wherein the repurposed connection is the cheapest identified high-cost connection in the connection pool.

* * * * *